United States Patent [19]
Saito et al.

[11] 3,973,231
[45] Aug. 3, 1976

[54] POSITION ADJUSTING DEVICE FOR IMAGE PICKUP TUBE COIL ASSEMBLY

[75] Inventors: Takemi Saito, Kawagoe; Shoji Itoya, Tokyo, both of Japan

[73] Assignee: Fuji Photo Optical Co., Ltd., Omiya, Japan

[22] Filed: Aug. 18, 1975

[21] Appl. No.: 605,653

[30] Foreign Application Priority Data
Aug. 27, 1974 Japan................................ 49-98254

[52] U.S. Cl................................. 335/210; 335/212
[51] Int. Cl.²............................................ H01F 7/00
[58] Field of Search............ 335/210, 212; 178/7.81

[56] References Cited
UNITED STATES PATENTS

| | | | |
|---|---|---|---|
| 3,629,751 | 12/1971 | Massa | 335/210 |
| 3,657,674 | 4/1972 | Goldammer | 335/210 |
| 3,697,909 | 10/1972 | Christensen et al. | 335/210 |
| 3,906,419 | 9/1975 | Bissinger | 335/210 |

FOREIGN PATENTS OR APPLICATIONS

| | | | |
|---|---|---|---|
| 142,010 | 7/1951 | Australia | 335/212 |

*Primary Examiner*—Harold Broome

[57] ABSTRACT

An image pickup tube coil assembly is provided on the outer surface thereof with a longitudinal groove and a lateral groove. A holder for holding the assembly is fixed to an optical system which forms an image focused on the face of the image pickup tube in the tube coil assembly. The holder is provided with two eccentric pins one of which is engaged with the longitudinal groove for rotating the assembly to effect registration of the image and the other of which is engaged with the lateral groove for longitudinally move the assembly back and forth to effect focus adjustment.

7 Claims, 4 Drawing Figures

POSITION ADJUSTING DEVICE FOR IMAGE PICKUP TUBE COIL ASSEMBLY

BACKGROUND OF THE INVENTION

1. Field of the Invention

This invention relates to a position adjusting device for an image pickup tube coil assembly, and more particularly to a device for adjusting the longitudinal and angular position of an image pickup tube coil assembly in a television camera or the like.

2. Description of the Prior Art

In a television camera or other instrument having an image pickup tube, the longitudinal position of the tube is adjusted with respect to the optical axis of the optical system for focusing an image on the image receiving face of the tube in order to form a sharp image focused on the face thereof. Further, the angular position of the tube about the optical axis of the image forming optical system is adjusted to obtain optimum registration. In the conventional holder for holding an image pickup tube coil assembly, it has been known to provide a screw on the coil assembly for finely controlling the longitudinal movement of the coil assembly for focus adjustment and to use a fine angular motion control device comprising a worm gear mechanism for registration adjustment.

The conventional position adjustment or controlling devices as described above are disadvantageous in that the mechanism for controlling the position is complicated and heavy in weight. Further, the conventional devices for controlling the position of the image pickup tube are expensive owing to their complicated structure. In addition, the conventional devices for controlling the tube position are inconvenient in operation thereof, since the operating portion for longitudinal position control and that for angular position control are separately provided. In order that the focusing and the registration may be conducted simultaneously, the operation portions for the two different opperations are desired to be combined.

SUMMARY OF THE INVENTION

In view of the above described defects inherent in the conventional devices for controlling the position of the image pickup tube in a television camera or the like, the primary object of the present invention is to provide a position adjusting device for an image pickup tube coil assembly which is simple in construction and light in weight.

Another object of the present invention is to provide a position adjusting device for an image pickup tube in which the longitudinal and angular position adjustment can easily be conducted.

Still another object of the present invention is to provide a position adjusting device for an image pickup tube which can be manufactured at a low cost.

The position adjusting device for an image pickup tube in accordance with the present invention is characterized in that a pair of eccentric pins are employed for longitudinally moving and rotating the image pickup tube with respect to the optical axis of an optical system for focusing an image on the face of the image pickup tube. The pair of eccentric pins are located in close proximity so that both the pins can be operated at the same position and the structure of the operating portion including the pins may be simplified.

In greater detail, the image pickup tube coil assembly is provided on the outer wall of the cylindrical body thereof with two grooves one extending longitudinally and the other extending perpendicularly to the longitudinal direction. A cylindrical holder which is fixed to an optical system for forming an image on the face of the image pickup tube is provided with two eccentric pins which are engaged with said two grooves. By rotating the eccentric pins, the relative position of the holder fixed to the optical system to the image pickup tube is varied longitudinally and angularly. By rotating the eccentric pin in the longitudinally extending groove, the image pickup tube is rotated about the optical axis. By rotating the eccentric pin in the laterally extending groove, the image pickup tube is longitudinally moved back and forth. Thus, the longitudinal position and the angular position of the image pickup tube are varied within the range of the length of the grooves. The holder is provided with a spring plate for holding said eccentric pins with a proper frictional force and with fixing screws for fixing the holder to the pickup tube after the position of the tube is determined.

In the present invention, it is assumed that the relative position of the image pickup tube to the coil assembly is adjusted in advance and the optical system for forming an image to be focused on the face of the image pickup tube is fixed to the holder in advance. In other words, it is assumed that the relative position of the holder to the coil assembly means the relative position of the optical system to the image pickup tube. Further, the rotation and longitudinal movement of the coil assembly means the rotation and the longitudinal movement of the image pickup tube.

DESCRIPTION OF THE PREFERRED EMBODIMENT

Figure 1:
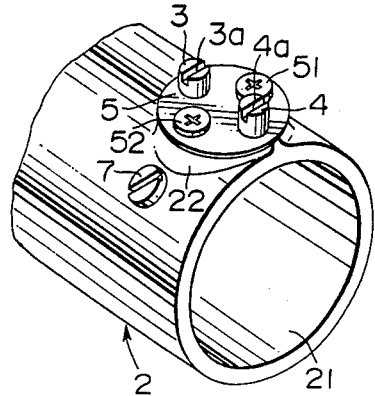
FIG. 1 is a perspective view showing a part of the holder for holding an image pickup tube provided with a position adjusting device in according with the present invention.
Figure 2:
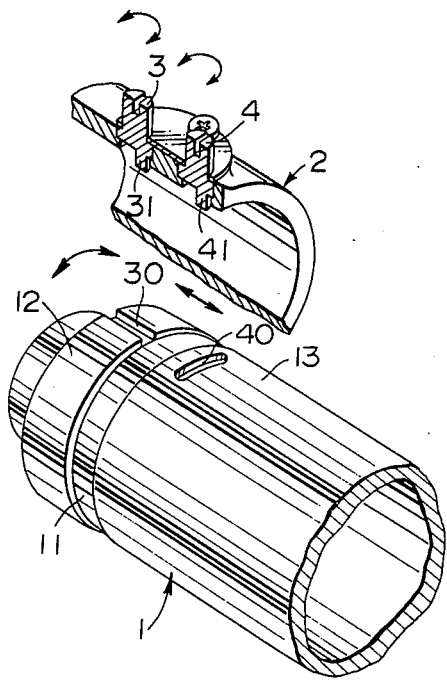
FIG. 2 is a fragmentary perspective view showing a part of the image pickup tube coil assembly and a part of the holder to be engaged with the image pickup tube assembly.

The position adjusting device for adjusting the relative position of an image pickup tube is illustrated in FIGS. 1 and 2 wherein a part of the device is shown in FIG. 1 which shows the rear part of a holder 2 and the other part of the device is shown in FIG. 2 which shows the front part of an image pickup tube coil assembly 1 provided with an image pickup tube installed therein.

The front end of the holder 2 is connected with an optical system including an objective lens (not shown) and the relative position of the optical system to the holder 2 is fixed in advance.

On the outer face of the image pickup tube coil assembly 1 in which an image pickup tube (not shown) is installed at a fixed relative position to the coil assembly, a peripheral groove 11 is formed to divide the outer face of the image pickup tube coil assembly (hereinafter referred to simply as "tube-coil assembly") into a main outer face 13 and a terminal outer face 12.

The main and terminal outer faces 13 and 12 of the tube-coil assembly 1 are fitted with the internal face 21 of the holder 2 when the tube-coil assembly 1 is inserted into the holder 2. Near the peripheral groove 11 on the main outer face 13 is provided a laterally extending groove 40 for focus adjustment. The groove 40 has a limited length and extends perpendicularly to the longitudinal direction of the tube-coil assembly 1. On the opposite side of the peripheral groove 11 formed around the tube-coil assembly 1 to said laterally extending groove 40 is provided a longitudinally extending groove 30 for registration. The groove 30 extends from one end to the other of the terminal outer face 12 of the tube-coil assembly.

Figure 3:
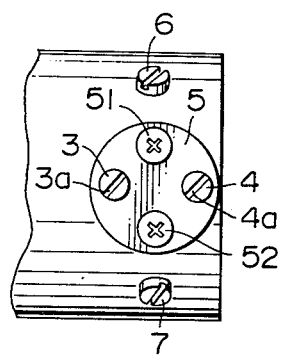
FIG. 3 is a partial plan view showing the rear end part of the holder provided with the position adjusting device.
Figure 4:
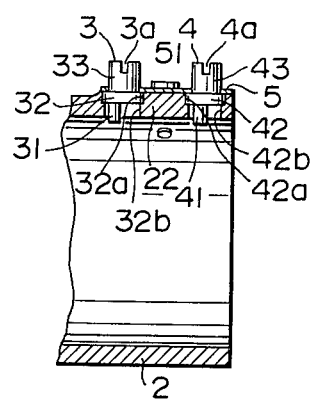
FIG. 4 is a partial longitudinal section showing the rear end part of the holder provided with the position adjusting device.

On the holder 2 are rotatably provided two adjusting pins 3 and 4 which are integrally fixed to eccentric pins 31 and 41 respectively which are in turn engaged with said grooves 30 and 40, respectively. The position adjusting pins 3 and 4 are provided with large diameter portions 32 and 42 beneath heads 33 and 43, and said eccentric pins 31 and 41 are fixed to the large diameter portions 32 and 42 as shown in FIG. 4. The heads 33 and 43 are provided with screw slots 3a and 4a, respectively. Said large diameter portions 32 and 42 are received by and rotatably held in holes 32a and 42a formed on the outer face of the holder 2. The holes 32a and 42a are connected with through holes 32b and 42b which extend through the wall 22 of the holder 2 in which said eccentric pins 31 and 41 are rotated. The eccentric pins 31 and 41 extend radially through the through holes 32b and 42b formed in the wall 22 of the holder 2. A disc shaped plate spring 5 is fixed on the wall 22 of the holder to hold the pins 3 and 4 with a pressure large enough to prevent them from freely rotating and small enough to allow them to be rotated with a screw driver by means of a pair of fixing screws 51 and 52 (see FIGS. 1 and 3). The holder 2 is further provided with a pair of tube-coil assembly fixing screws 6 and 7 as shown in FIG. 3. The fixing screws 6 and 7 are screwed into the peripheral groove 11 onto the tube-coil assembly 1 to stationarily hold the latter with respect to the holder 2.

As shown in FIG. 2, the eccentric pins 31 and 41 of the adjusting pins 3 and 4 are engaged with the longitudinal groove 30 and the lateral groove 40, respectively, so that the rotation of the adjusting pin 3 makes the tube-coil assembly 1 rotate about its axis which is identical with the optical axis of said optical system and the rotation of the adjusting pin 4 makes the assembly 1 longitudinally move back and forth. By the rotation of the assembly 1, the registration of the image formed on the face of the image pickup tube can be effected. By the longitudinal movement of the assembly 1, the focus adjustment of said image can be effected.

After the registration and focus adjustment of the image on the image pickup tube have been completed, said fixing screws 6 and 7 are screwed inward to fix the holder 2 to the tube-coil assembly 1. The peripheral groove 11 is formed for the purpose of protecting the outer surface of the tube-coil assembly 1 which might be roughened by repeated screwing of the screws 6 and 7 onto the surface of the assembly 1.

We claim:

1. A device for adjusting the position of an image pickup tube with respect to an optical system for forming an image to be focused on the face of said image pickup tube comprising a coil assembly fixed to the image pickup tube, said coil assembly having a cylindrical body in which said image pickup tube is inserted with the face of the tube being exposed at one end of the coil assembly; a holder fixed to the optical system for forming the image to be focused on said face of the image pickup tube, said holder being cylindrical in shape and said coil assembly being inserted therein with its outer surface fitted with the inner surface of said holder, the outer surface of said coil assembly being provided with a longitudinally extending groove and a laterally extending groove; and adjusting pins rotatably mounted to said holder, said pins each having an eccentric pin portion to be engaged with said longitudinally extending groove and said laterally extending groove respectively, whereby the longitudinally and angular position of the coil assembly relative to the holder are adjusted by rotating said adjusting pins.

2. A device for adjusting the position of an image pickup tube with respect to an optical system as defined in claim 1 wherein said holder is provided with means for fixing the holder to the coil assembly after the position of the latter is adjusted with respect to the former.

3. A device as claimed in claim 2 wherein said fixing means is at least one screw which is screwed through said holder and extends up to the surface of the coil assembly.

4. A device as claimed in claim 3 wherein the surface of said coil assembly is provided with a groove extending around the coil assembly in a plane perpendicular to the axis of the coil assembly, said screw for fixing the holder to the coil assembly being screwed into the groove extending around the coil assembly.

5. A device as claimed in claim 4 wherein said groove extending around the coil assembly extends between said longitudinally extending groove and said laterally extending groove.

6. A device as claimed in claim 1 wherein said adjusting pins are held on the holder by spring means with a pressure which is large enough to prevent the pins from rotating freely and small enough to allow the pins to be rotated by a screw driver.

7. A device as claimed in claim 6 wherein said spring means is a spring plate which is fixed on the holder, said spring plate having holes through which said adjusting pins extend, said adjusting pins having a large diameter portion the diameter of which is larger than that of said holes of the spring plate so that the adjusting pins are held on the holder by the spring force of the spring plate.

* * * * *